(12) United States Patent
Hosokai et al.

(10) Patent No.: US 11,307,612 B2
(45) Date of Patent: Apr. 19, 2022

(54) PORTABLE INFORMATION DEVICE AND COVER DEVICE

(71) Applicant: LENOVO (SINGAPORE) PTE. LTD., Singapore (SG)

(72) Inventors: Tatsuya Hosokai, Yokohama (JP); Tetsuya Sano, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 17/084,578

(22) Filed: Oct. 29, 2020

(65) Prior Publication Data

US 2022/0083098 A1 Mar. 17, 2022

(30) Foreign Application Priority Data

Sep. 14, 2020 (JP) .............................. JP2020-153805

(51) Int. Cl.
*G06F 1/16* (2006.01)
(52) U.S. Cl.
CPC .......... *G06F 1/1616* (2013.01); *G06F 1/1641* (2013.01); *G06F 1/1652* (2013.01); *G06F 1/1681* (2013.01)
(58) Field of Classification Search
CPC combination set(s) only.
See application file for complete search history.

(56) References Cited

U.S. PATENT DOCUMENTS

| | | | | |
|---|---|---|---|---|
| 9,348,450 B1 * | 5/2016 | Kim | ...................... | G06F 1/1681 |
| 10,015,897 B1 * | 7/2018 | Hong | ...................... | G09F 9/301 |
| 10,082,838 B1 * | 9/2018 | Hong | ...................... | E05D 7/00 |
| 10,082,839 B1 * | 9/2018 | Turchin | ...................... | G06F 1/1681 |
| 10,120,421 B1 * | 11/2018 | Hong | ...................... | E05D 11/0054 |
| 10,423,019 B1 * | 9/2019 | Song | ...................... | G06F 1/1681 |
| 10,429,903 B2 * | 10/2019 | Hong | ...................... | E05D 11/082 |
| 10,429,904 B2 * | 10/2019 | Turchin | ...................... | G06F 1/1641 |
| 10,585,458 B2 * | 3/2020 | Park | ...................... | G06F 1/1652 |
| 10,712,784 B2 * | 7/2020 | Hong | ...................... | E05D 7/00 |
| 10,761,574 B1 * | 9/2020 | Hsu | ...................... | E05D 7/00 |
| 10,798,836 B2 * | 10/2020 | Manuel | ...................... | E05D 3/122 |
| 10,860,056 B2 * | 12/2020 | Watamura | ...................... | G06F 1/1616 |
| 10,883,534 B2 * | 1/2021 | Bae | ...................... | G06F 1/1616 |
| 10,928,860 B2 * | 2/2021 | Park | ...................... | H04M 1/0216 |
| 11,137,801 B2 * | 10/2021 | Park | ...................... | G06F 1/1652 |
| 2017/0061836 A1 * | 3/2017 | Kim | ...................... | G06F 1/1626 |
| 2021/0026407 A1 * | 1/2021 | Park | ...................... | G06F 1/1618 |

(Continued)

FOREIGN PATENT DOCUMENTS

JP 2018105961 A 7/2018

*Primary Examiner* — Lisa Lea-Edmonds
(74) *Attorney, Agent, or Firm* — Shimokaji IP

(57) ABSTRACT

A portable information device includes: a first chassis; a second chassis coupled to the first chassis to be rotatable relative to the first chassis; and a cover device having a first cover section which covers the back surface of the first chassis, a second cover section which covers the back surface of the second chassis, and a folding cover section which connects between the first cover section and the second cover section to be rotatable relative to each other. The cover device further has a sheet-shaped member provided to face a side edge of the folding cover section on the inner surface side of the folding cover section and provided to be movable relative to the inner surface of the folding cover section.

12 Claims, 12 Drawing Sheets

(56) References Cited

U.S. PATENT DOCUMENTS

2021/0120687 A1\* 4/2021 Kim .................... H05K 5/0226
2021/0132664 A1\* 5/2021 Park .................... H04M 1/0218
2021/0356998 A1\* 11/2021 Park .................... G06F 1/1681
2021/0365072 A1\* 11/2021 Kinoshita ............. G06F 1/1652

\* cited by examiner

PORTABLE INFORMATION DEVICE AND COVER DEVICE

FIELD OF THE INVENTION

The present invention relates to a portable information device having a cover device and the cover device.

BACKGROUND OF THE INVENTION

A portable information device such as a laptop PC or a tablet PC is required to avoid damage or breakdown when being carried around. Further, it is desired that the appearance design and the sense of touch of the portable information device should be of high quality. Therefore, a cover device may be mounted on the back of the chassis of the portable information device for the purpose of protection or decoration. The applicant proposes a cover device for a foldable tablet PC in Japanese Unexamined Patent Application Publication No. 2018-105961.

A cover device mounted on a foldable portable information device as mentioned above is folded to follow the chassis folded like a book. When being folded in this way, an opening to face the side is formed between a folding cover section (a section corresponding to the spine of a book) of the cover device and each folded end of the chassis. When foreign matter or the like enters from this opening between the cover device and the chassis, there is concern that the foreign matter or the like could interfere with the rotational operation of the chassis or adversely affect electronic components mounted inside the chassis such as a display.

The present invention has been made in consideration of the above-mentioned technical problem, and it is an object of the present invention to provide a portable information device and a cover device capable of preventing foreign matter or the like from entering into a chassis.

SUMMARY OF THE INVENTION

A portable information device according to the first aspect of the present invention includes: a first chassis; a second chassis provided adjacent to the first chassis and coupled to the first chassis to be rotatable relative to the first chassis between a flat plate form in which the first chassis and the second chassis are lined up with each other in a direction perpendicular to a surface normal direction and a folded form in which the first chassis and the second chassis are folded to overlap each other in the surface normal direction; and a cover device having a first cover section to cover the back surface of the first chassis, a second cover section to cover the back surface of the second chassis, and a folding cover section to connect between the first cover section and the second cover section to be rotatable relative to each other, wherein the cover device further has a sheet-shaped member provided to face a side edge of the folding cover section on the inner surface side of the folding cover section and provided to be movable relative to the inner surface of the folding cover section, and the cover device is so provided that the folding cover section covers each other's adjacent edges of the first chassis and the second chassis in the folded form, and the sheet-shaped member further covers the adjacent edges inside the folding cover section as viewed from a rotating axis direction of the first chassis and the second chassis.

A cover device according to the second aspect of the present invention is a cover device configured to cover the back surface of a chassis of a portable information device, including: a first cover section; a second cover section; a folding cover section which connects between the first cover section and the second cover section to be rotatable relative to each other; and a sheet-shaped member provided to face a side edge of the folding cover section on the inner surface side of the folding cover section and provided to be movable relative to the inner surface of the folding cover section.

The above-described aspects of the present invention can prevent foreign matter or the like from entering into the chassis.

DETAILED DESCRIPTION OF THE INVENTION

A preferred embodiment of a portable information device and a cover device according to the present invention will be described in detail below with reference to the accompanying drawings.

Figure 1:
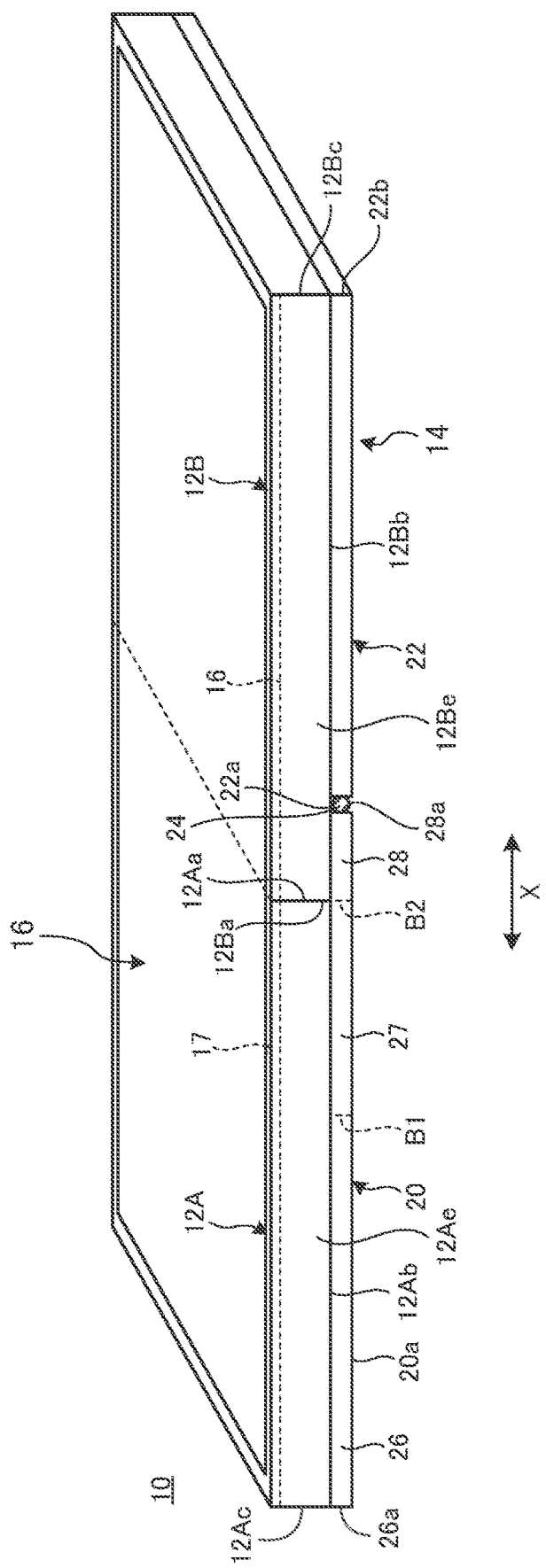
FIG. 1 is a perspective view schematically illustrating a state where a portable information device according to one embodiment is opened and shaped into a flat plate form.
Figure 2A:
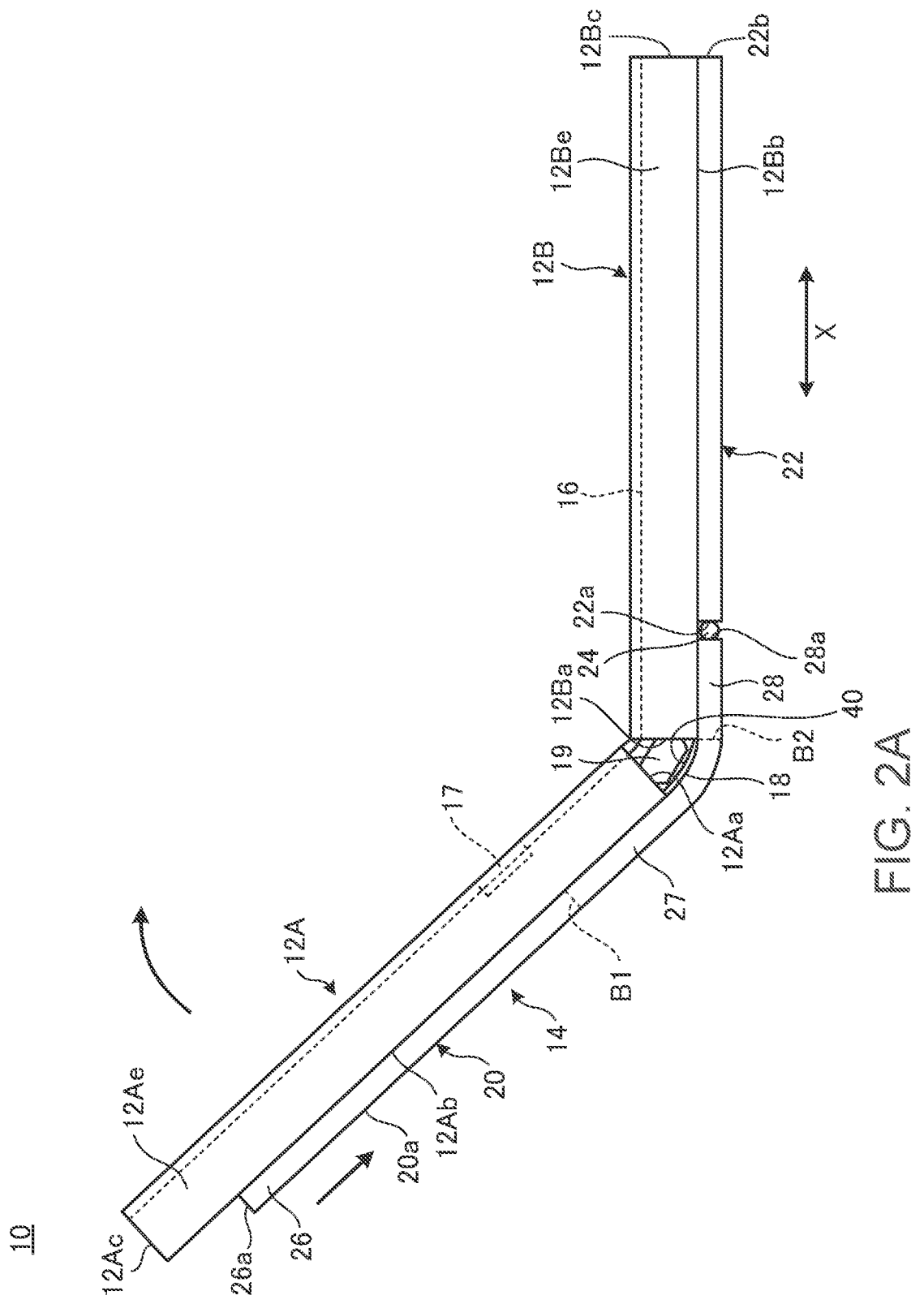
FIG. 2A is a side view in a state where the portable information device illustrated in FIG. 1 is shaped into a laptop form.
Figure 2B:
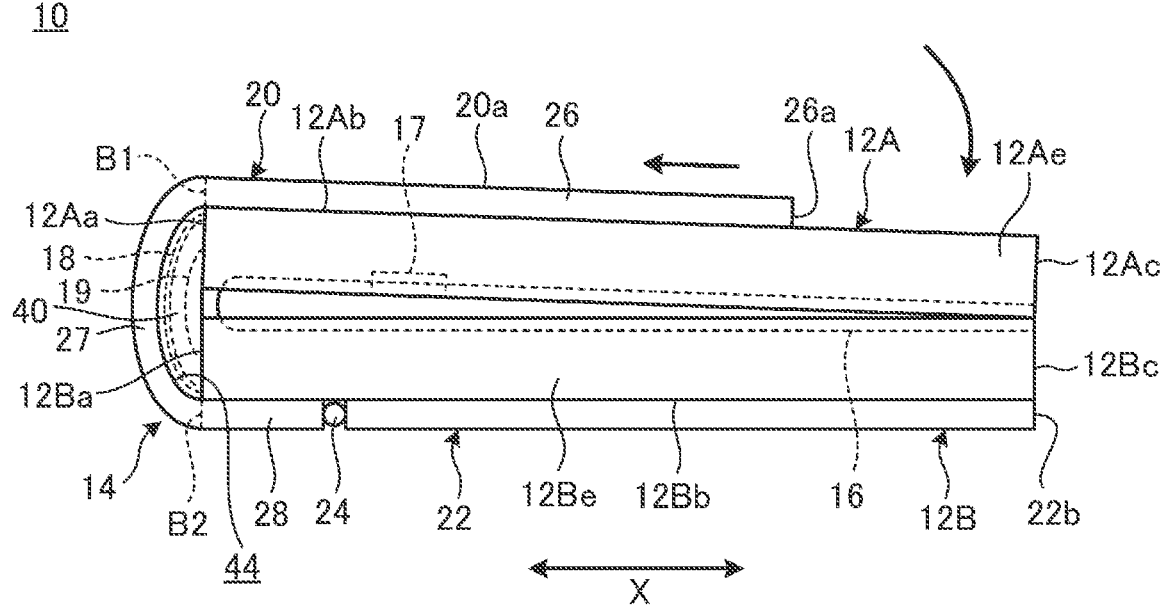
FIG. 2B is a side view in a state where the portable information device illustrated in FIG. 2A is closed and shaped into a folded form.

FIG. 1 is a perspective view schematically illustrating a state where a portable information device 10 according to one embodiment is opened and shaped into a flat plate form. FIG. 2A is a side view in a state where the portable information device 10 illustrated in FIG. 1 is shaped into a laptop form. FIG. 2B is a side view in a state where the portable information device 10 illustrated in FIG. 2A is closed and shaped into a folded form.

As illustrated in FIG. 1 to FIG. 2B, the portable information device 10 includes a first chassis 12A, a second chassis 12B, and a cover device 14. The portable information device 10 of the embodiment is a foldable tablet PC or laptop PC. The cover device 14 has a protection function to cover the outer surfaces of the chassis 12A and 12B in order to protect the chassis 12A and 12B, and a decoration function to decorate the outer surfaces in order to enhance the appearance design. The portable information device on which the cover device 14 is mounted may also be a common clamshell laptop PC, a smartphone, a portable game machine, or the like.

First, a structure example of the portable information device 10 will be described. The portable information device 10 includes the chassis 12A, 12B and a display 16.

The chassis 12A and 12B are placed adjacent to each other. Adjacent edges 12Aa and 12Ba of the chassis 12A and 12B are covered internally with a spine member 18. Each of the chassis 12A and 12B is formed into a rectangular, plate-shaped member with side walls standing on three sides except the adjacent edge 12Aa, 12Ba, respectively. The chassis 12A, 12B is formed from a metal plate made of stainless steel, magnesium steel, aluminum steel, or the like, or formed from a fiber-reinforced plastic plate containing reinforced fiber such as carbon fiber.

The portable information device 10 as illustrated in FIG. 1 to FIG. 2B will be described below by expressing a line-up direction of the chassis 12A, 12B as an X direction and a direction orthogonal to the line-up direction along the adjacent edges 12Aa, 12Ba as a Y direction.

The adjacent edges 12Aa and 12Ba of the chassis 12A and 12B are coupled to each other through a pair of hinges 19, 19. The chassis 12A and 12B are coupled by the hinges 19 to be rotatable respectively to each other between the flat plate form illustrated in FIG. 1 and the folded form illustrated in FIG. 2B. In the flat plate form, the chassis 12A and 12B are lined up with each other in a direction (X direction) perpendicular to a surface normal direction, and shaped into a signal plate form in which the adjacent edges 12Aa and 12Ba face each other and the chassis 12A and 12B line up in the X direction. In the folded form, the chassis 12A and 12B are folded to overlap each other and closed like a book. In the folded form, the adjacent edges 12Aa and 12Ba line up in a folding direction through a predetermined gap to face substantially in the same direction, respectively.

The hinges 19 can generate a predetermined rotation torque. For example, the hinges 19 are disposed in both end portions of the adjacent edges 12Aa and 12Ba of the chassis 12A and 12B in the Y direction, and located outside of an outer peripheral edge of the display 16, respectively. The portable information device 10 of the embodiment is so set that the rotation center between the chassis 12A and 12B by the hinges 19 matches the surface of the display 16.

Inside of the respective chassis 12A and 12B, various electronic components such as a motherboard, various semiconductor chips like a CPU mounted on the motherboard, a communication module, a battery device, and a cooling device are mounted. Reference numeral 17 in FIG. 1 to FIG. 2B denotes an imaging camera to face from an opening formed in a bezel surrounding the display 16 on the surface of the first chassis 12A.

The display 16 is, for example, a touch panel liquid crystal display. A band-shaped range of the display 16 extending in the Y direction across the adjacent edges 12Aa and 12Ba is a folding region. Thus, the display 16 is foldable together when the chassis 12A and 12B are folded, and opened and closed along with the opening/closing operation of the chassis 12A and 12B. The display 16 is, for example, a flexible display such as organic EL (Electro Luminescence) having a highly flexible paper structure or the like.

The spine member 18 is a thin plate-shaped member having flexibility. The spine member 18 is provided across the inner surfaces of the chassis 12A and 12B to span across the adjacent edges 12Aa and 12Ba. The spine member 18 extends in the Y direction between the hinges 19, 19. For example, one end of the spine member 18 in the X direction is fixed to the first chassis 12A and the other end is supported to be slidable in the X direction with respect to the second chassis 12B. The spine member 18 is to hide a gap between the adjacent edges 12Aa and 12Ba inside the cover device 14 when the portable information device 10 is folded (see FIG. 7A). The spine member 18 may be omitted.

Figure 3:
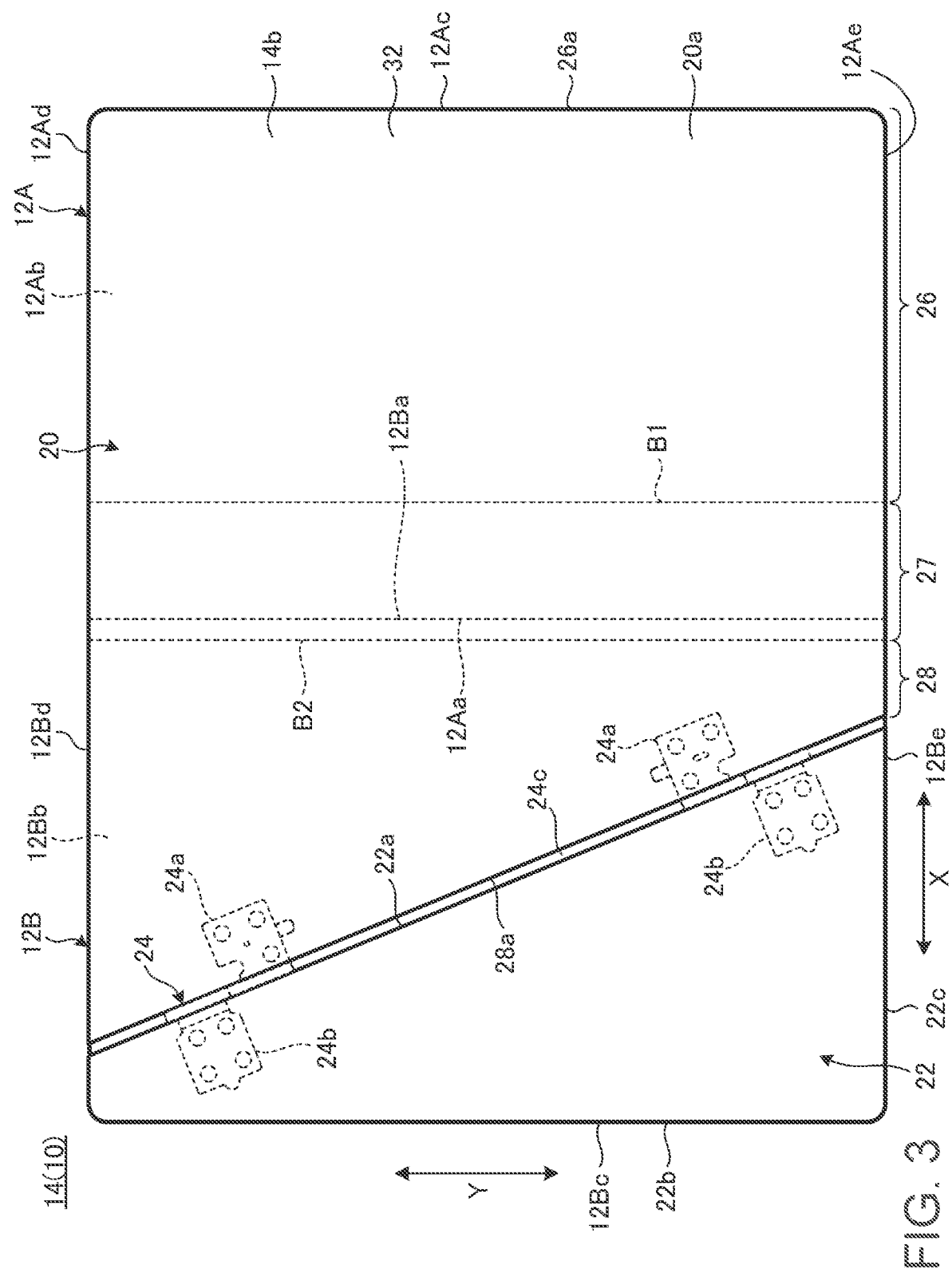
FIG. 3 is a bottom view of the portable information device as viewed from the side of a cover device.
Figure 4:
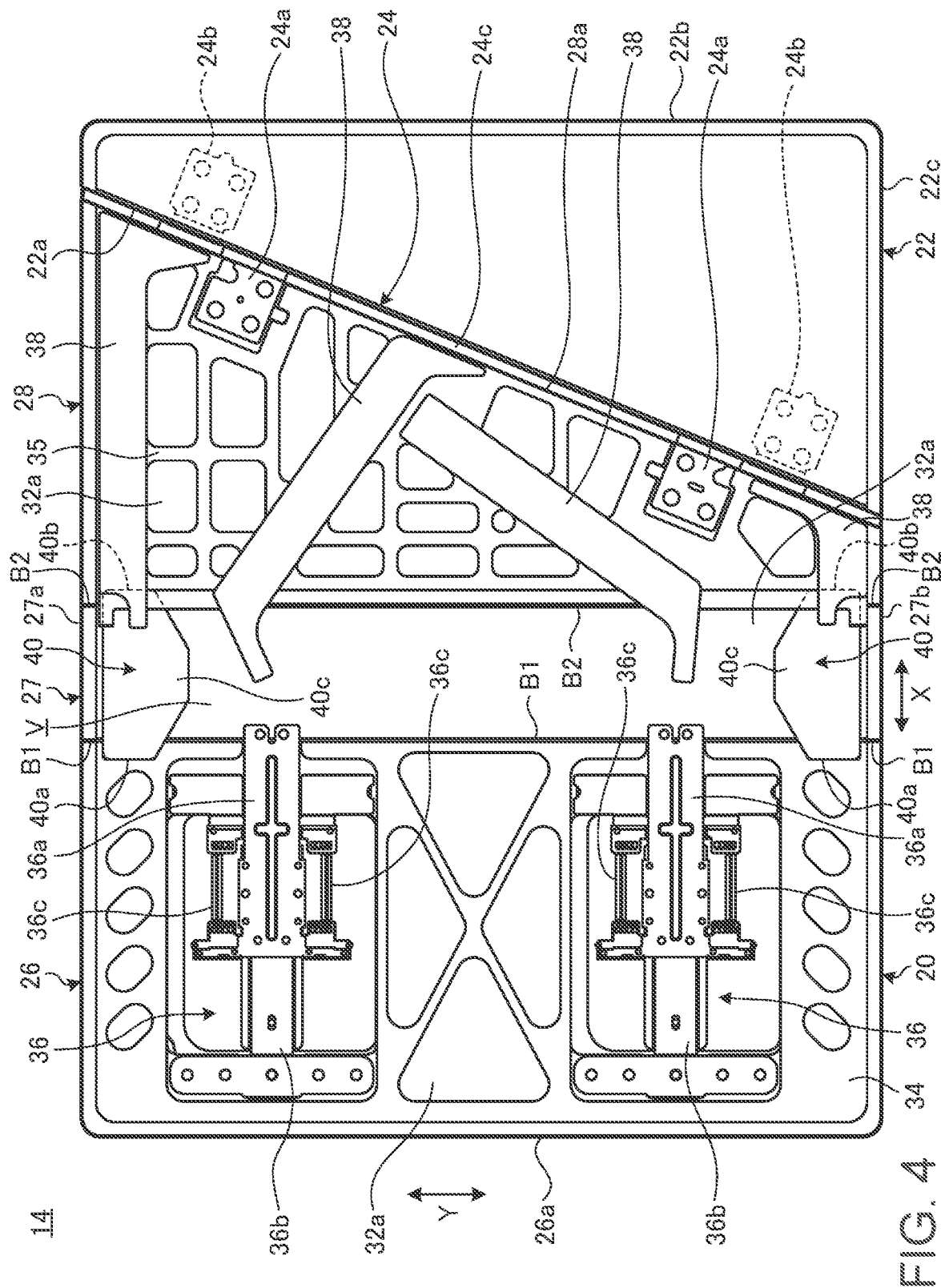
FIG. 4 is a plan view of the cover device as viewed from the side of a mounting surface for chassis.

Next, a structure example of the cover device 14 will be described. FIG. 3 is a bottom view of the portable information device 10 as viewed from the side of the cover device 14. FIG. 4 is a plan view of the cover device 14 as viewed from the side of a mounting surface (inner surface) for the chassis 12A, 12B.

As illustrated in FIG. 1 to FIG. 3, the cover device extends to cover back surfaces 12Ab and 12Bb of the chassis 12A and 12B. In the flat plate form (see FIG. 1), the cover device 14 covers the entire back surfaces 12Ab and 12Bb. In the laptop form and the folded form (see FIG. 2A and FIG. 2B), the cover device 14 covers most of the back surface 12Ab and the entire back surface 12Bb.

The cover device 14 includes a base cover section 20, a stand cover section 22, and a stand hinge mechanism 24. The cover sections 20, 22 extend in the X direction across the stand hinge mechanism 24.

In the flat plate form, the cover sections 20, 22 cover the entire surfaces 12Ab and 12Bb as a whole. In other words, in the flat plate form, the cover device 14 covers the portable information device 10 from an open edge 12Ac of the first chassis 12A to an open edge 12Bc of the second chassis 12B in the X direction, and covers the portable information device 10 between side faces 12Ad and 12Ae of the first chassis 12A and side faces 12Bd and 12Be of the second chassis 12B in the Y direction. The open edges 12Ac and 12Bc are located on the other sides of the adjacent edges 12Aa and 12Ba in the X direction, respectively, which are side faces extending in the Y direction. The side faces 12Ad, 12Ae, and 12Bd, 12Be are side faces extending in the X direction, respectively, which are orthogonal to the adjacent edges 12Aa and 12Ba, respectively.

The base cover section 20 has a first cover section 26, a folding cover section 27, and a second cover section 28 in this order from the side of the first chassis 12A toward the side of the second chassis 12B.

The first cover section 26 is a thin plate-shaped member provided to be slidable in the X direction relative to the back surface 12Ab of the first chassis 12A. In the flat plate form illustrated in FIG. 1 and FIG. 3, a distal edge 26a of the first cover section 26 matches the open edge 12Ac of the first chassis 12A. The distal edge 26a is located on the other side of a border line B1 with the folding cover section 27 in the X direction, which is an edge extending in the Y direction. In the laptop form and the folded form illustrated in FIG. 2A and FIG. 2B, the first cover section 26 is slid to a position where the distal edge 26a is retreated from the open edge 12Ac to the side of the adjacent edge 12Aa.

The folding cover section 27 is provided in a position between the chassis 12A and 12B across the adjacent edges 12Aa and 12Ba, which is a band-shaped region narrow in the X direction and extending in the Y direction. The folding cover section 27 is connected to the first cover section 26 to be foldable on the border line B1 along the Y direction on the side of the first chassis 12A. Then, the folding cover section 27 is connected to the second cover section 28 to be foldable on a border line B2 along the Y direction on the side of the second chassis 12B. The folding cover section 27 has flexibility as a whole to connect between the first cover section 26 and the second cover section 28 to be rotatable relative to each other. The folding cover section is a flexible hinge to rotate the cover device 14 following the rotational operation between the chassis 12A and 12B. The folding cover section 27 has a width dimension in the X direction to be able to cover the adjacent edges 12Aa and 12Ba of the chassis 12A and 12B at least in the folded form illustrated in FIG. 2B.

The second cover section 28 is a thin plate-shaped member to cover the back surface 12Bb of the second chassis 12B together with part of the folding cover section 27 and the stand cover section 22. The second cover section 28 is formed into a shape substantially line-symmetric with respect to the stand cover section 22, which is a substantially trapezoidal shape in plan view in the embodiment. The second cover section 28 is fixed relatively to the back surface 12Bb of the second chassis 12B. The second cover section 28 of the embodiment is fixed directly to the back surface 12Bb. An edge 28a of the second cover section 28 on the other side of the border line B2 in the X direction is adjacent to the stand cover section 22 through the stand hinge mechanism 24. The edge 28a is inclined in the X direction gradually toward the Y direction.

The base cover section 20 includes, for example, a cover material 32 spanning from the first cover section 26 to the second cover section 28, and core materials 34 and 35 fixed with adhesive or the like to an inner surface 32a of the cover material 32.

The cover material 32 is a member to form the outer surface of the base cover section 20. The cover material 32 is, for example, a laminated body of multi-layer sheets, and has flexibility as a whole. For example, the cover material is so formed that the surface material to form the outermost surface is formed of artificial leather, natural leather, resin, or the like. Thus, the cover material 32 enhances the appearance design and the sense of touch of the base cover section 20.

The core material 34 is a hard resin plate that is the base of the first cover section 26. The core material 34 is formed into a rectangular shape over substantially the entire surface of the first cover section 26, in which recessed portions and cutout portions are formed in various places for the placement of parts, weight saving, and the like. The core material 35 is a hard resin plate that is the base of the second cover section 28. The core material 35 is formed into a trapezoidal shape over substantially the entire second cover section 28, in which recessed portions and cutout portions are formed in various places for the placement of parts, weight saving, and the like. In the base cover section 20, the cover material 32 located in a valley V between the right and left core materials 34 and 35 forms the folding cover section 27. In other words, the folding cover section 27 has desired flexibility because of being formed of the flexible cover material 32 without having the hard core materials 34 and 35.

The first cover section 26 is coupled to the first chassis 12A through a pair of slide mechanisms 36 lined up at an interval in the Y direction to be slidable relative to the first chassis 12A in the X direction. Each of the slide mechanisms 36 is composed, for example, of a rail 36a fixed to the back surface 12Ab of the first chassis 12A, and a slider 36b fixed to the core material 34 and coupled to the rail 36a to be movable relative to the rail 36a in the X direction. In the slide mechanism 36, since the slider 36b moves relative to the rail 36a, the first cover section 26 can be moved relative to the first chassis 12A. Springs 36c are stretched between the rail 36a and the slider 36b to always urge the first cover section 26 in a direction to slide the distal edge 26a toward the open edge 12Ac of the first chassis 12A.

In the second cover section 28, for example, the core material 35 is fixed to the back surface 12Bb of the second chassis 12B by using plural pieces (four pieces in FIG. 4) of double-sided adhesive tape 38.

The stand cover section 22 is provided to be rotatable relative to the second cover section 28 of the base cover section 20 and the back surface 12Bb of the second chassis 12B. The stand cover section 22 of the embodiment is coupled to the back surface 12Bb of the second chassis 12B through the stand hinge mechanism 24. The stand cover section 22 is formed into a shape substantially line-symmetric with respect to the second cover section 28, which is a substantially trapezoidal shape in plan view in the embodiment. The stand cover section 22 has an edge 22a adjacent to the edge part 28a of the second cover section 28 through the stand hinge mechanism 24, where the edge 22a is coupled to the stand hinge mechanism 24. In the stand cover section 22, a distal edge 22b on the other side of the edge 22a matches the open edge 12Bc of the second chassis 12B.

By rotational operation of the stand hinge mechanism 24, the stand cover section 22 can move from a stored position (0°) where the distal edge 22b abuts against the back surface 12Bc in a direction away gradually from the back surface 12Bc. The distal edge 22b can move, for example, up to a position (180°) at which the distal edge 22b abuts against a surface 20a of the base cover section 20 and further movement is restricted. The stand cover section 22 is set to a proper angle sticking out of the back surface 12Bb to make a bottom edge 22c as a trapezoidal bottom abut on a desk surface or the like so as to function as a stand in order to keep the portable information device 10 in a standing position. Although the structure of the stand cover section 22 may also be substantially similar to the structure of the first cover section 26 or the second cover section 28, it is preferred to provide any cover material 32 similar to the cover material 32 not only on the outer surface but also on the inner surface.

The stand hinge mechanism 24 couples the stand cover section 22 to the base cover section 20 and the second chassis 12B to be rotatable relative to the base cover section 20 and the second chassis 12B. As illustrated in FIG. 3 and FIG. 4, the stand hinge mechanism 24 is so constructed that a pair of brackets 24a, 24a fixed to the second chassis 12B and a pair of brackets 24b, 24b fixed to the stand cover section 22 are coupled through a hinge shaft 24c to be relatively rotatable around the shaft. Thus, the stand hinge mechanism 24 supports the stand cover section 22 to be rotatable relative to the second chassis 12B and the second cover section 28.

The stand cover section 22 and the stand hinge mechanism 24 may be omitted. In this case, for example, the cover device 14 may be formed into such a shape that the second cover section 28 covers the entire back surface 12Bb of the second chassis 12B.

Figure 5A:
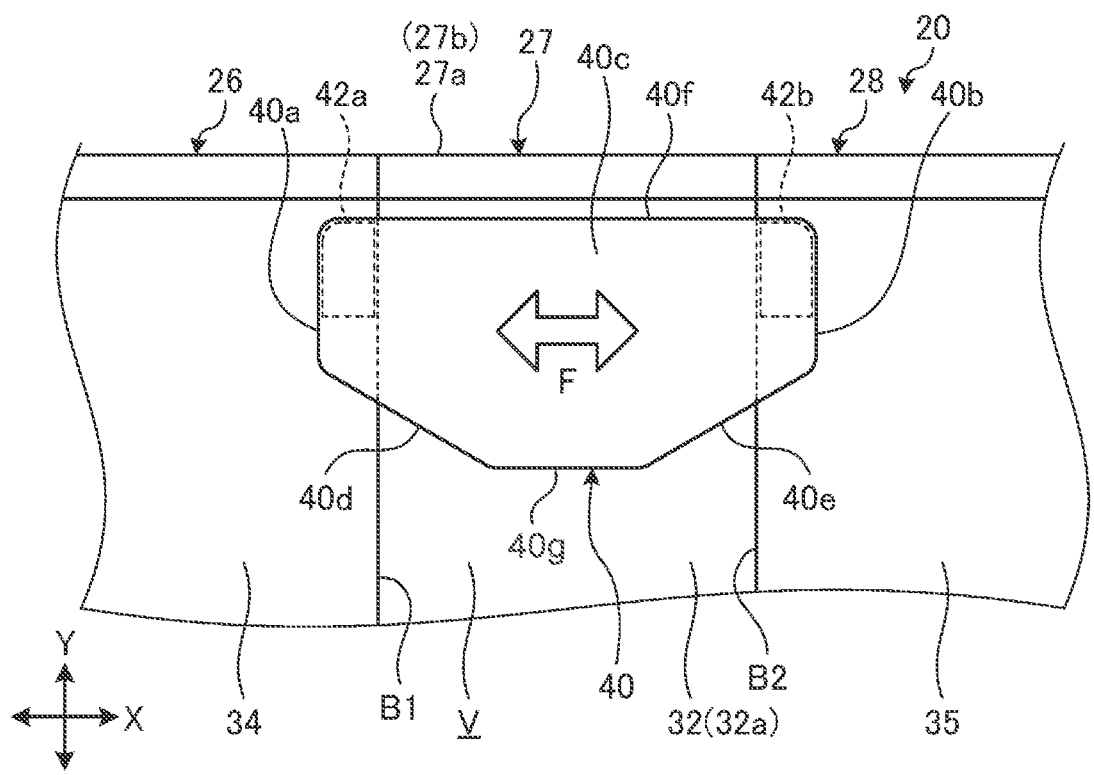
FIG. 5A is a schematic enlarged plan view of one sheet-shaped member and the vicinity thereof illustrated in FIG. 4.
Figure 5B:
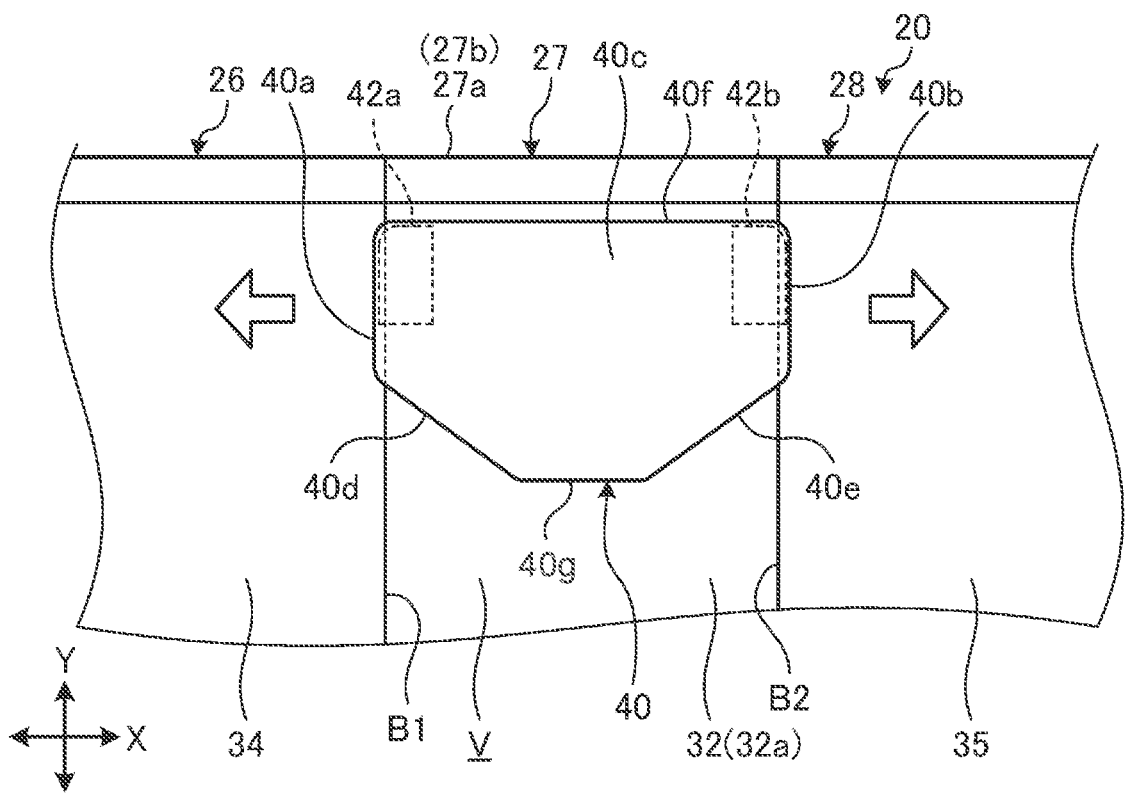
FIG. 5B is a plan view illustrating a state before the sheet-shaped member illustrated in FIG. 5A is attached.

As illustrated in FIG. 4, the cover device 14 includes sheet-shaped members 40 in both end portions of the folding cover section 27 in the extending direction (Y direction) of the folding cover section 27, respectively. FIG. 5A is a schematic enlarged plan view of one sheet-shaped member 40 and the vicinity thereof illustrated in FIG. 4. FIG. 5B is a plan view illustrating a state before the sheet-shaped member 40 illustrated in FIG. 5A is attached. FIG. 5A and FIG. 5B representatively illustrate the structure of one sheet-shaped member 40 and the vicinity thereof. Since the structure of the other sheet-shaped member 40 and the vicinity thereof is the same as or similar to the structure illustrated in FIG. 5A and the like except that the structure is symmetrical with respect to the structure illustrated in FIG. 5A and the like, the detailed description thereof will be omitted. The same applies to FIG. 7A and the like.

As illustrated in FIG. 4 and FIG. 5A, each sheet-shaped member 40 is provided across the folding cover section 27 in the X direction to be movable relative to the folding cover section 27. Each sheet-shaped member 40 is formed of a material or with a structure stretchable in the X direction. The sheet-shaped member 40 of the embodiment is a black thin rubber sheet. The sheet-shaped member 40 may also be a fabric or resin sheet having elasticity. Each sheet-shaped member 40 is formed into a substantially trapezoidal shape in plan view, and the respective sheet-shaped members 40 are shaped to be symmetrical with respect to each other on a vertical plane along the X direction.

One sheet-shaped member 40 is disposed to face a side edge 27a of the folding cover section 27 facing side faces 12Ad and 12Bd of the chassis 12A and 12B. The other sheet-shaped member 40 is disposed to face a side edge 27b of the folding cover section 27 facing the other side faces 12Ae and 12Be of the chassis 12A and 12B.

A first end part 40a on one end side of each sheet-shaped member 40 in the X direction is fixed with an adhesive 42a to the core material 34 of the first cover section 26, and a second end part 40b on the other side is fixed with an adhesive 42b to the core material 35 of the second cover section 28, thus providing the sheet-shaped member 40 across the folding cover section 27 in the X direction. The adhesives 42a and 42b may also be pressure sensitive adhesives. Each of the adhesives 42a and 42b is provided only in a portion of the end part 40a, 40b in the width direction thereof along the Y direction on the side of the side edge 27a (27b), respectively. In other words, the sheet-shaped member 40 facing the side edge 27a is such that only corner portions of the end parts 40a, 40b and the neighborhood thereof on the side of the side edge 27a are fixed to the core materials 34 and 35, and the other portions of the end parts 40a, 40b are not fixed. The sheet-shaped member 40 facing the side edge part 27b is such that only corner portions of the end parts 40a and 40b and the neighborhood thereof on the side of the side edge 27b are fixed to the core materials 34 and 35, and the other portions of the end parts 40a and 40b are not fixed.

Each sheet-shaped member 40 is in such a state that a central part 40c between the end parts 40a and 40b is not fixed with adhesive and is free to move over the inner surface 32a of the folding cover section 27.

Each sheet-shaped member 40 has chamfer shapes 40d and 40e in corner portions of the end parts 40a and 40b in the width direction thereof along the Y direction on the other side of the side edge 27a (27b). Therefore, each sheet-shaped member 40 is such that the length of an inner edge 40g in the X direction on the other side of an outer edge 40f facing the side edge 27a (27b) is shorter than that of the outer edge 40f. The chamfer shapes 40d and 40e may be omitted.

As illustrated in FIG. 5A, the sheet-shaped member 40 is disposed along the inner surface 32a of the folding cover section 27 in such a tension state as to keep a resilient force F in a stretching direction along the X direction in the flat plate form. In other words, the sheet-shaped member 40 always receives a tensile force (resilient force F) in the X direction in the flat plate form. Therefore, in an unloaded state before being fixed to the base cover section 20, the width of the sheet-shaped member 40 is compressed in the X direction more than in the state of FIG. 5A (see FIG. 5B). As a method of attaching such a sheet-shaped member 40, it can be exemplified a method of fixing the sheet-shaped member 40 to the core materials 34 and 35 with the adhesives 42a and 42b while stretching the sheet-shaped member 40 in the X direction as illustrated in FIG. 5B.

Next, the action of the sheet-shaped member 40 will be described.

Figure 6A:
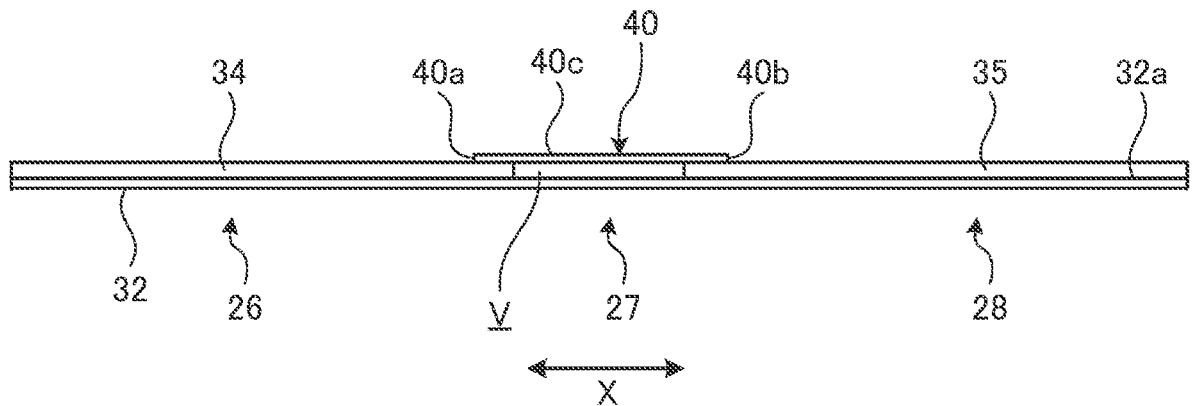
FIG. 6A is a schematic side view of the cover device in the flat plate form.
Figure 6B:
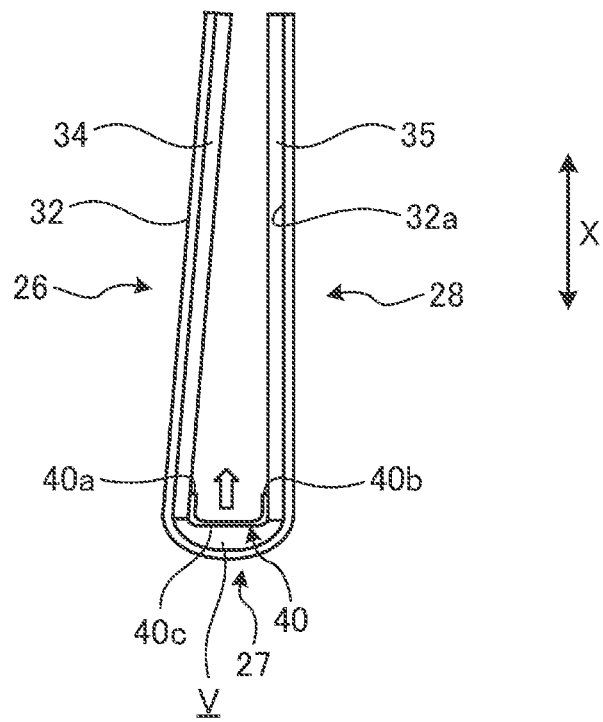
FIG. 6B is a schematic side view in a state where the cover device illustrated in FIG. 6A is shaped into the folded form.

FIG. 6A is a schematic side view of the cover device 14 in the flat plate form. FIG. 6B is a schematic side view in a state where the cover device 14 illustrated in FIG. 6A is shaped into the folded form. FIG. 6A and FIG. 6B schematically illustrate only the base cover section 20 with the stand cover section 22 and the stand hinge mechanism 24 omitted.

In the flat plate form illustrated in FIG. 6A, the sheet-shaped member 40 is disposed along the inner surface 32a of the folding cover section 27 in a state across the folding cover section 27 in the X direction. Since FIG. 6A illustrates the plate thickness of the core materials 34, 35 as exaggeratedly thick, the sheet-shaped member 40 is illustrated to float greatly from the inner surface 32a of the folding cover section 27. However, in an actual product, the plate thickness of the core materials 34, 35 is in a range of about 0.5 to 2 mm. Therefore, the sheet-shaped member 40 is in proximity to or contact with the inner surface 32a of the folding cover section 27.

When the chassis 12A and 12B are changed from the flat plate form to the folded form, the end parts 40a and 40b of the sheet-shaped member 40 gradually approach each other along with the folding operation of the cover sections 26 and 27. Therefore, as illustrated in FIG. 6B, the distance between the end parts 40a and 40b of the sheet-shaped member 40 gets closer and are compressed by receiving the resilient force F at the same time in the folded form. As a result, the central part 40c gets away from the inner surface 32a of the folding cover section 27, floats up and moves to the sides of the adjacent ends 12Aa and 12Ba.

Figure 7A:
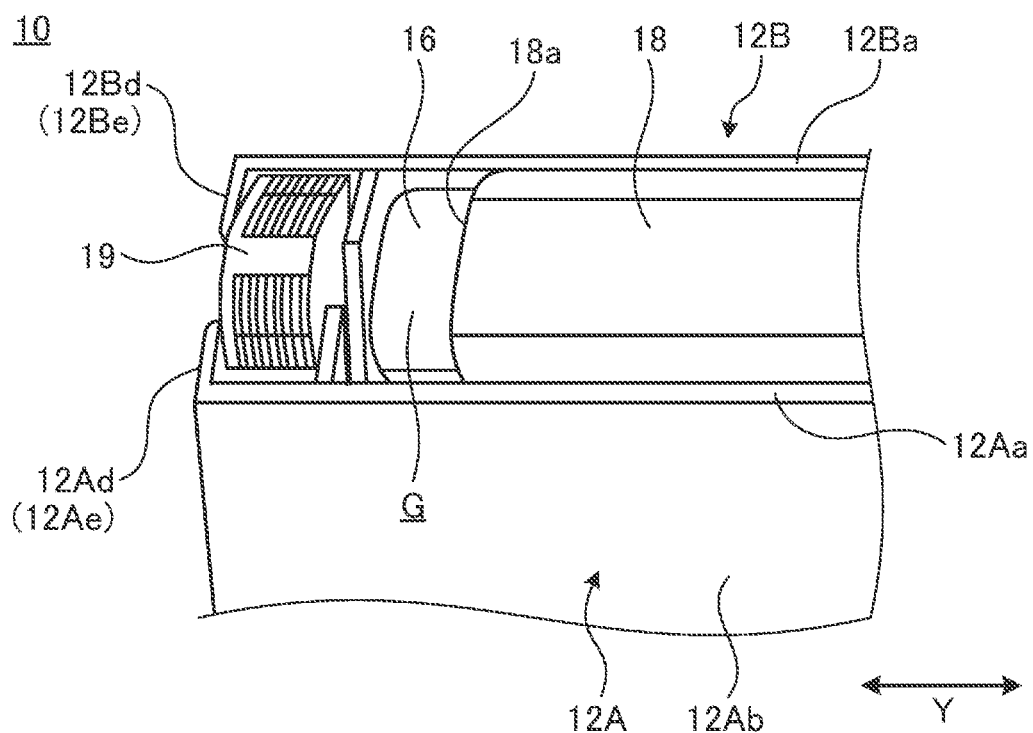
FIG. 7A is a schematic enlarged perspective view of one hinge of the chassis and the vicinity thereof in the folded form.
Figure 7B:
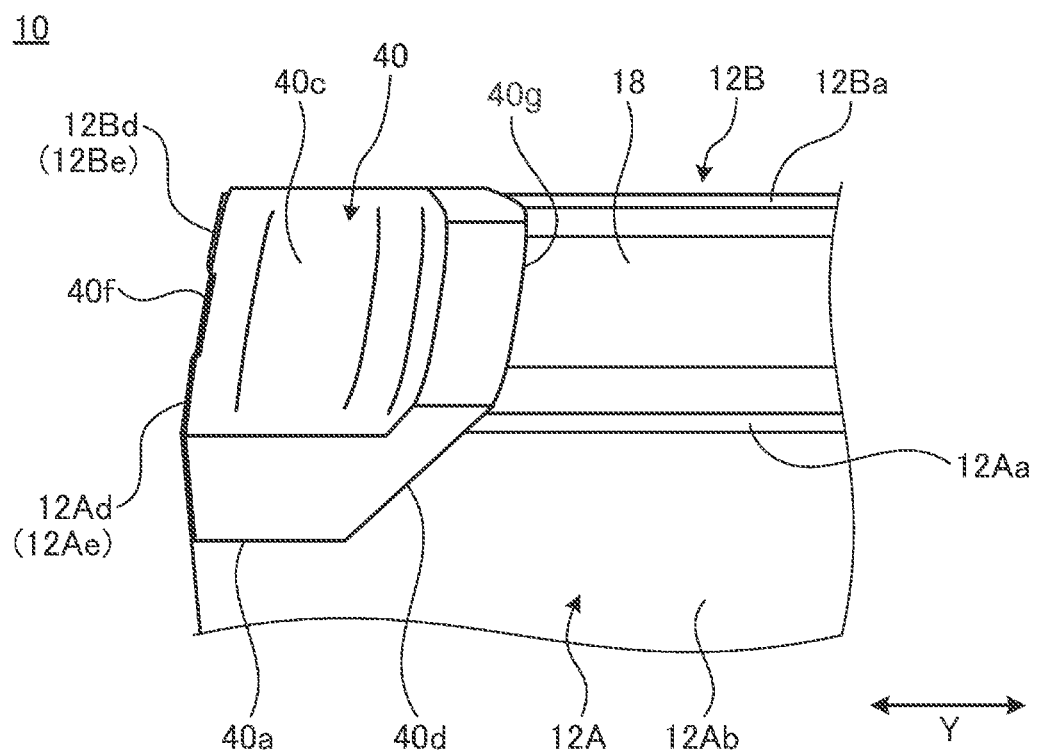
FIG. 7B is a schematic perspective view in a state where the sheet-shaped member is provided in the part illustrated in FIG. 7A.
Figure 8A:
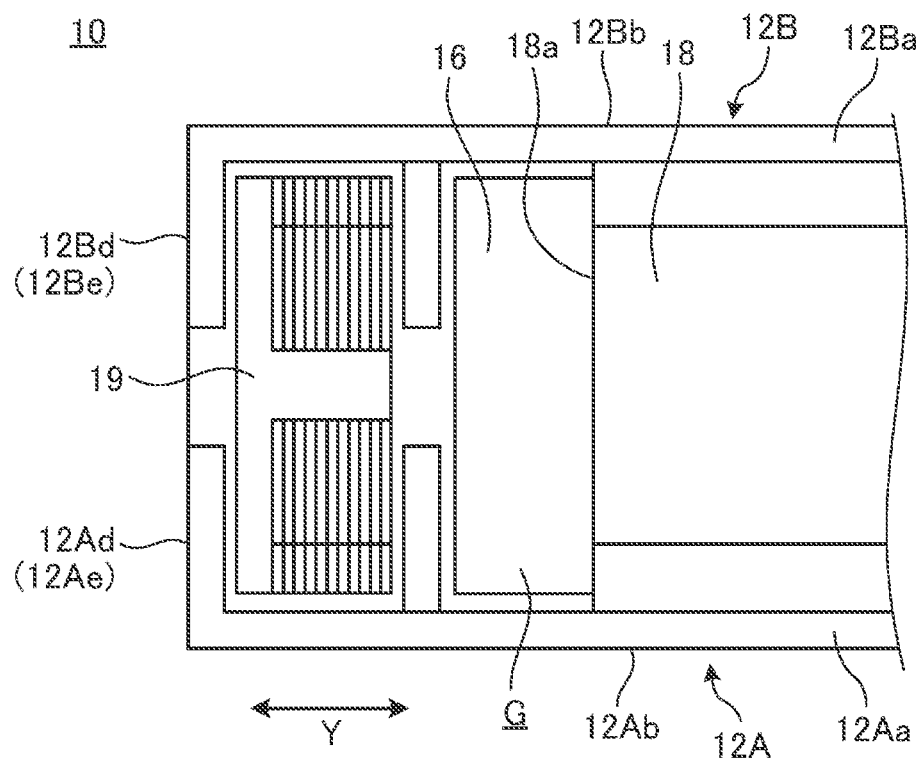
FIG. 8A is a schematic plan view of the part illustrated in FIG. 7A.
Figure 8B:
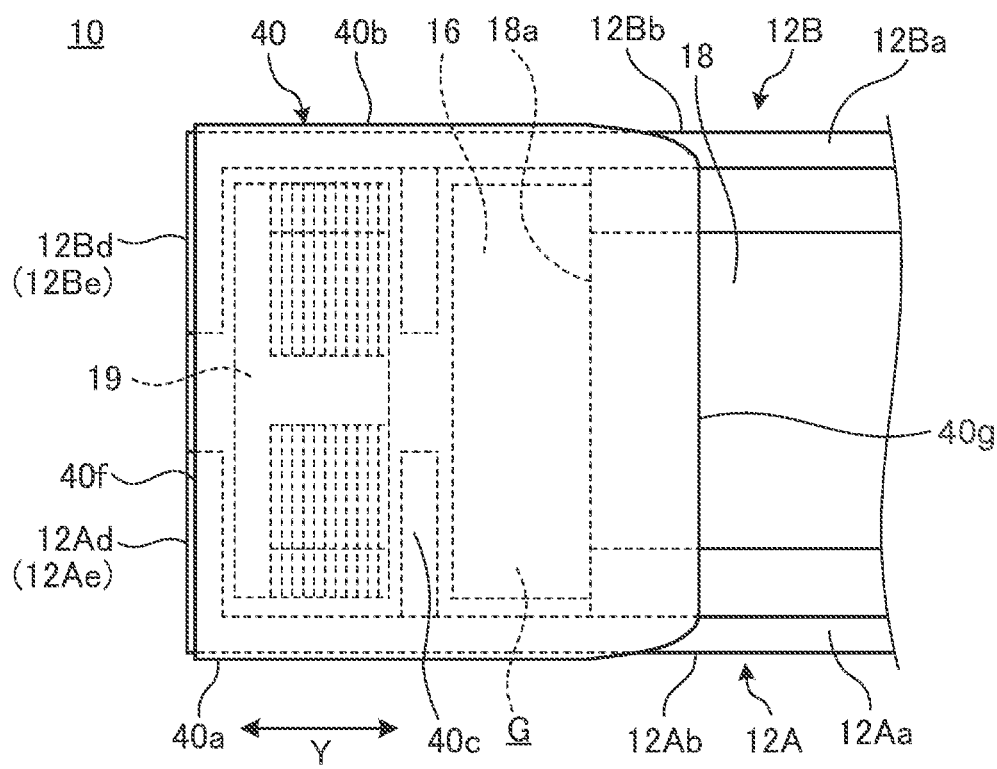
FIG. 8B is a schematic plan view of the part illustrated in FIG. 7B.

FIG. 7A is a schematic enlarged perspective view of one hinge 19 of the chassis 12A, 12B and the vicinity thereof in the folded form. FIG. 8A is a schematic plan view of the part illustrated in FIG. 7A. FIG. 7A and FIG. 8A omit the cover device 14 from the illustrations, and the same applies to FIG. 13A. FIG. 7B is a schematic perspective view in a state where the sheet-shaped member 40 is provided in the part illustrated in FIG. 7A. FIG. 8B is a schematic plan view of the part illustrated in FIG. 7B. FIG. 7B and FIG. 8B illustrate only the sheet-shaped member 40 among respective components of the cover device 14 to omit the other components from the illustrations. The same applies to FIG. 11 and FIG. 13B.

As illustrated in FIG. 7A and FIG. 8A, the spine member 18 does not cover the hinge 19 in the portable information device 10 of the embodiment. Specifically, a gap G having a predetermined width in the Y direction is formed between each of ends 18a and each of the hinges 19 on both sides of the spine member 18 in the Y direction. The gap G is provided to prevent the spine member 18 from interfering with the hinge 19 mainly during rotational operation. Each side of the display 16 is positioned in the back of the gap G. On the other hand, in the portable information device 10 of the embodiment, the folding cover section 27 is expanded in an arc shape in the folded form as illustrated in FIG. 2B, and a gap is formed between the inner surface 32a of the folding cover section 27 and the adjacent ends 12Aa and 12Ba. This gap forms a side opening 44 which opens to the sides of the side faces 12Ad, 12Ae, and 12Bd, 12Be (see FIG. 2B).

Therefore, if the cover device 14 does not have the sheet-shaped members 40, the hinge 19 will be exposed from the side opening 44 in the folded form. This deteriorates the appearance quality of the portable information device 10. Further, a section from the side opening 44 to the display 16 communicates with the outside through the gap G. As a result, when foreign matter or the like enters from the side opening 44, there is a possibility that the foreign matter or the like will reach the back side of the display 16 through the gap G. In such a case, there is concern that when the portable information device 10 is opened from the folded form to the flat plate form, the foreign matter could be sandwiched between the display 16 and the chassis 12A, 12B.

Thus, the cover device 14 of the embodiment has the sheet-shaped member 40 provided to be movable relative to the inner surface 32a of the folding cover section 27. Therefore, in the folded form illustrated in FIG. 7B and FIG. 8B, the sheet-shaped member 40 floating up from the folding cover section 27 as illustrated in FIG. 6B is in close contact with the chassis 12A, 12B to mask the hinge 19 and the gap G, and is stretched in the X direction. In other words, the sheet-shaped member 40 is provided to cover the adjacent ends 12Aa and 12Ba inside the folding cover section 27 as viewed from a rotating axis direction (Y direction) between the chassis 12A and 12B (see FIG. 2B). Thus, the sheet-shaped member 40 prevents the hinge 19 from being exposed from the side opening 44 in the folded form and from impairing the appearance quality (also see FIG. 2B). Further, the sheet-shaped member 40 prevents foreign matter from entering the inside of the chassis 12A, 12B from the side opening 44 through the gap G. Therefore, as illustrated in FIG. 7B and FIG. 8B, it is preferred that the sheet-shaped member 40 should have a width dimension in the Y direction to be able to mask a section from the hinge 19 to the end 18a of the spine member 18.

Figure 9:
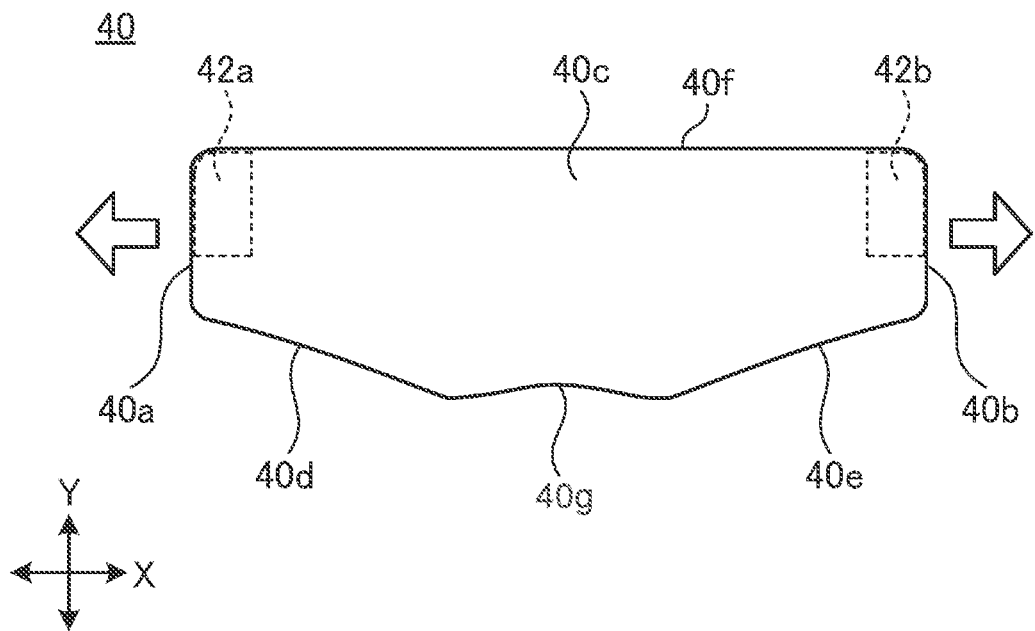
FIG. 9 is a plan view schematically illustrating a state where the sheet-shaped member illustrated in FIG. 5A is stretched.

As illustrated in FIG. 7B and FIG. 9, the sheet-shaped member 40 of the embodiment is provided with the adhesives 42a and 42b only on the side of the outer edge 40f facing the side faces 12Ad, 12Ae and 12Bd, 12Be in the width direction of the end parts 40a and 40b along the Y direction. Therefore, when the sheet-shaped member 40 is stretched in the X direction, the outer edge 40f stretches substantially linearly and only the inner edge 40g stretches while being recessed in a curved shape. Thus, in the sheet-shaped member 40, since the outer edge 40f facing the side opening 44 is not recessed, the hinge 19 can be masked more reliably (see FIG. 7B and FIG. 8B).

On the other hand, the inner edge 40g is located in the back of the side opening 44 and hence is not visible from the outside. Therefore, there is no problem if the inner edge 40g is deformed in a recessed shape. Note that the inner edge 40g is illustrated linearly in FIG. 7B for the purpose of clarifying the state where the sheet-shaped member 40 covers the section from the hinge 19 to the spine member 18.

Figure 10:
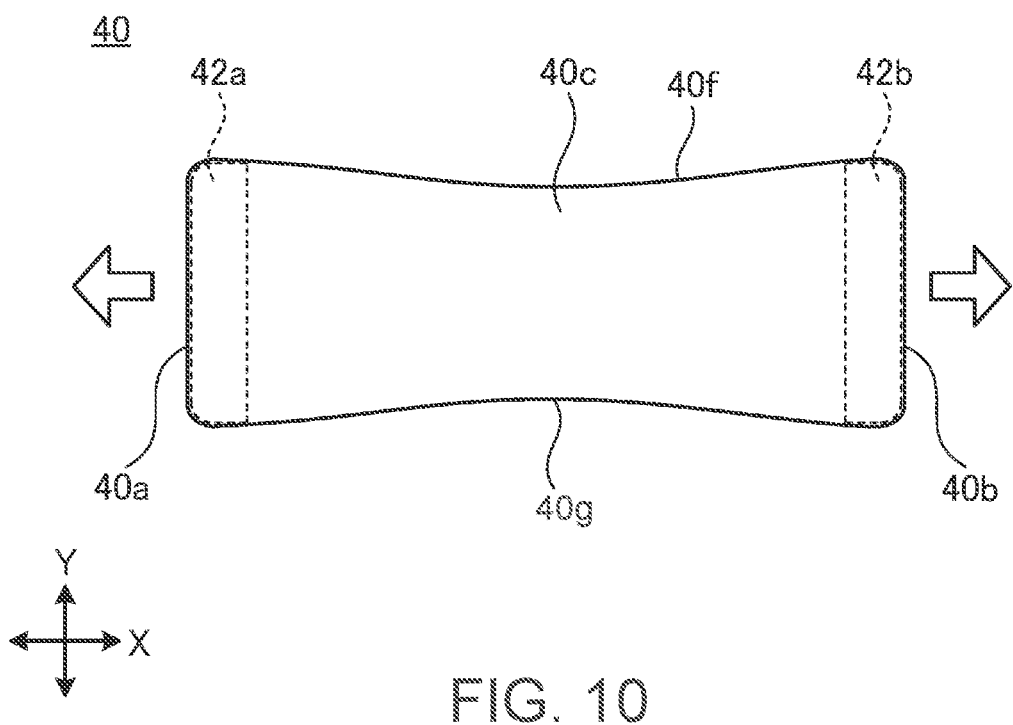
FIG. 10 is a plan view schematically illustrating a state where a rectangular sheet-shaped member is stretched.

Suppose that the entire end parts 40a and 40b of the sheet-shaped member 40 in the width direction along the Y direction are fixed with the adhesives 42a and 42b as illustrated in FIG. 10. When the sheet-shaped member 40 having this structure is stretched in the X direction, not only the inner edge 40g but also the outer edge 40f are deformed in a recessed shape, respectively. As a result, since part of the hinge 19 is exposed due to the deformed outer edge 40f, there is concern that this part could be made visible from the side opening 44. However, the sheet-shaped member 40 as illustrated in FIG. 10 can be used effectively, for example, in such a structure that the hinge 19 is formed in an inconspicuous color such as black, or that the hinge 19 is placed on the central side of the adjacent ends 12Aa and 12Ba in the Y direction (for example, see FIG. 13A and FIG. 13B).

On the other hand, since some portions of the end parts 40a and 40b of the sheet-shaped member 40 are not fixed with the adhesives 42a and 42b, there is concern that the portions could roll up in the folded form. In this case, there is a concern that when part of the sheet-shaped member rolls up, the part could interfere with any other electronic component or the like to cause unexpected trouble. In this regard, the sheet-shaped member 40 has chamfer shapes 40d and 40e in the corner portions of the end parts 40a and 40b on the other sides of the adhesives 42a and 42b. Therefore, as illustrated in FIG. 7B, the sheet-shaped member 40 prevents such portions of the end parts 40a and 40b as not to be fixed with the adhesives 42a and 42b from rolling up in the folded form (also see FIG. 9).

If the sheet-shaped member 40 is formed into a rectangular shape without the chamfer shapes 40d, 40e and the adhesives 42a and 42b are provided substantially in the entire end parts 40a and 40b like the sheet-shaped member 40 illustrated in FIG. 10, the occurrence of the above-mentioned trouble due to roll-up can be prevented.

Figure 11:
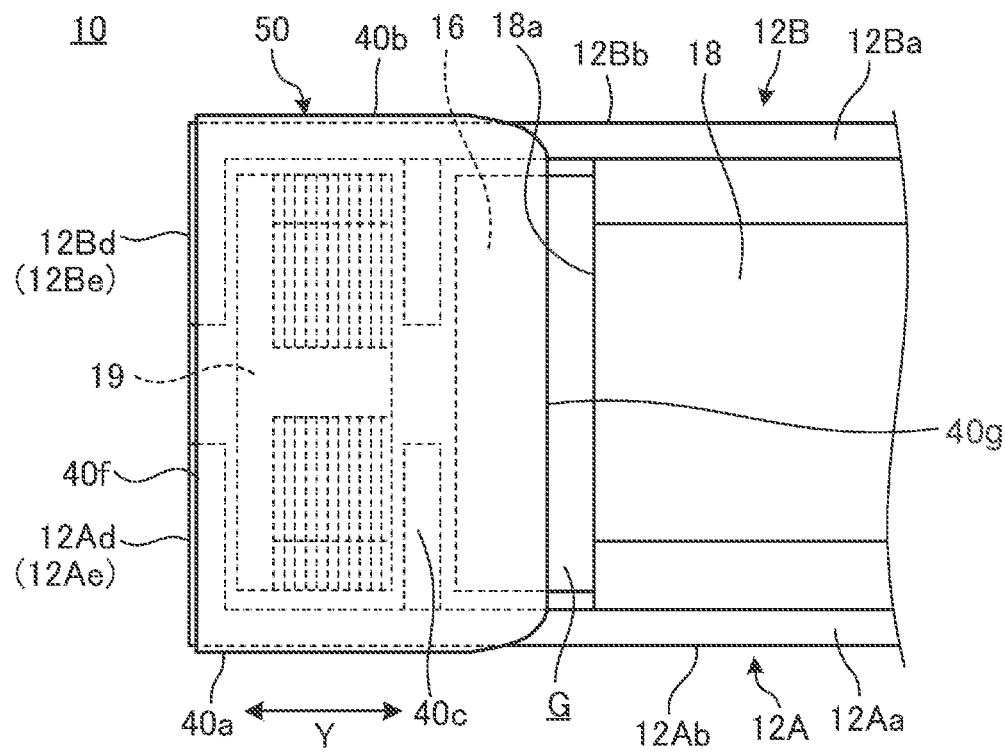
FIG. 11 is a schematic enlarged plan view of a key part of the portable information device using a sheet-shaped member according to a first modification in the folded form.

FIG. 11 is a schematic enlarged plan view of a key part of the portable information device 10 using a sheet-shaped member 50 according to a first modification in the folded form. Elements of the sheet-shaped member 50 having identical or similar functions and effects to the above-mentioned sheet-shaped member 40 are given the same reference numerals to omit detailed description thereof. The same applies below.

The above-mentioned sheet-shaped member 40 has the width dimension in the Y direction to be able to mask the section from the hinge 19 to the end 18a of the spine member 18 (see FIG. 8B). On the other hand, the sheet-shaped member 50 illustrated in FIG. 11 has a width dimension in the Y direction to cover a section from the hinge 19 to part of the gap G. In other words, the sheet-shaped member 50 has such a structure as not to cover the spine member 18. This sheet-shaped member 50 covers part of the gap G while covering the hinge 19 in the folded form. Therefore, the hinge 19 is prevented even by the sheet-shaped member 50 from being exposed. Further, since the sheet-shaped member 50 closes part of the gap G, entering of foreign matter from the gap G can be prevented to some extent. Such a sheet-shaped member 50 is also effective, for example, for a portable information device without the spine member 18.

Figure 12:
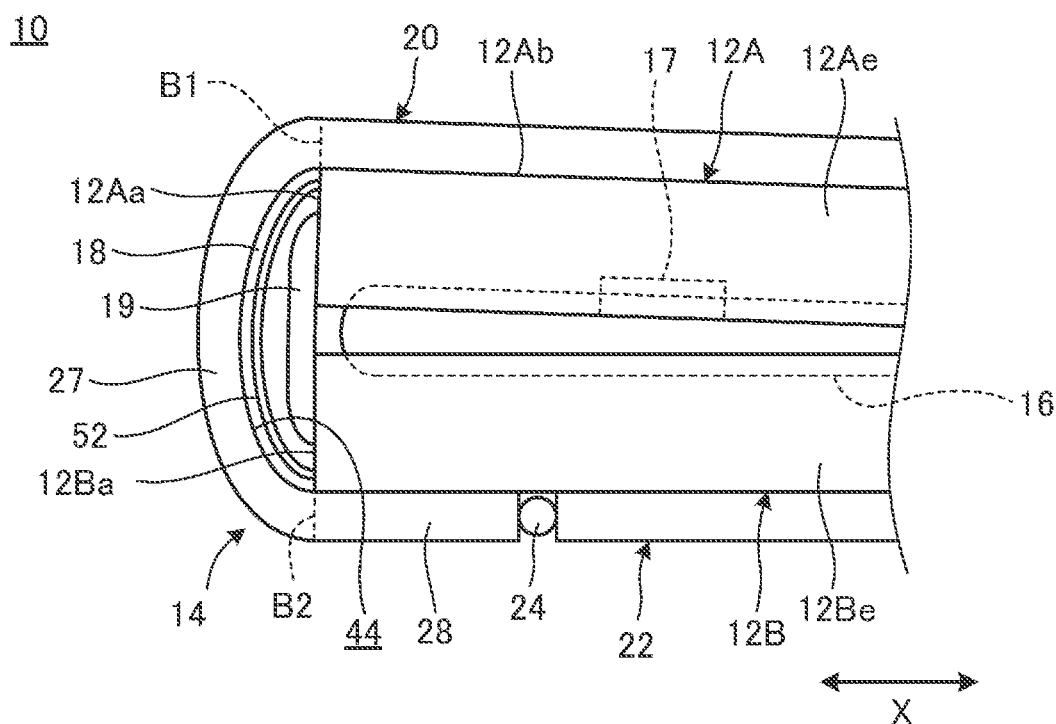
FIG. 12 is a schematic enlarged side view of a key part of the portable information device using a sheet-shaped member according to a second modification in the folded form.

FIG. 12 is a schematic enlarged side view of a key part of the portable information device 10 using a sheet-shaped member 52 according to a second modification in the folded form.

The sheet-shaped member 52 illustrated in FIG. 12 has the same width dimension in the Y direction as that of the sheet-shaped member 50 illustrated in FIG. 11, which does not cover the spine member 18. This sheet-shaped member 52 is fixed to the base cover section 20 in such a state that the resilient force F thereof is smaller than those of the sheet-shaped members 40 and 50 mentioned above, or that there is no resilient force F. Therefore, the sheet-shaped member 52 is compressed between the end parts 40a and 40b with the distance therebetween shortened in the folded form to move to the side of the adjacent edges 12Aa and 12Ba, but not to be in close contact with the hinge 19 and the chassis 12A, 12B. In other words, the sheet-shaped member 52 is disposed substantially concentrically with the folding cover section 27 in a position a little away from the hinge 19, and the adjacent edges 12Aa and 12Ba in the folded form. Thus, the sheet-shaped member 52 is disposed to cross part of the side opening 44, and this prevents foreign matter or the like from entering from the side opening 44. In other words, the sheet-shaped member 52 is also disposed to cover the adjacent edges 12Aa and 12Ba inside the folding cover section 27 as viewed from the rotating axis direction between the chassis 12A and 12B (Y direction). The sheet-shaped member 52 may be formed from a resin sheet having flexibility, rather than a material having elasticity such as rubber.

Figure 13A:
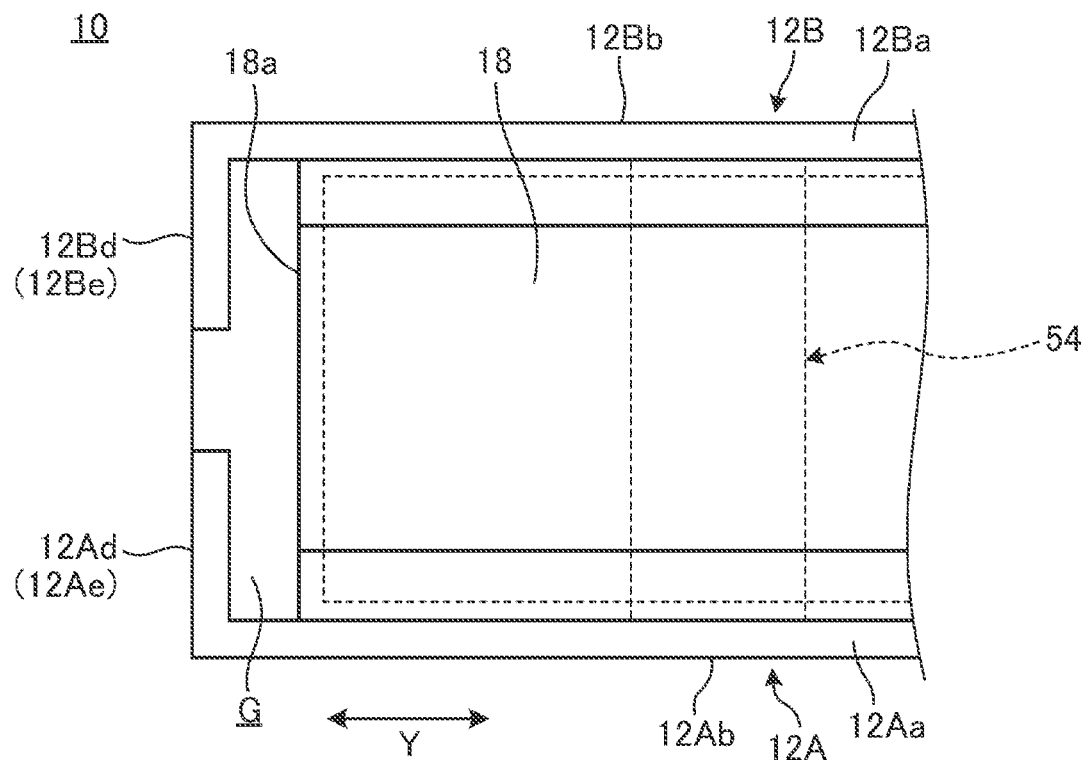
FIG. 13A is a schematic enlarged plan view of a key part of the portable information device using a hinge according to a modification in the folded form.
Figure 13B:
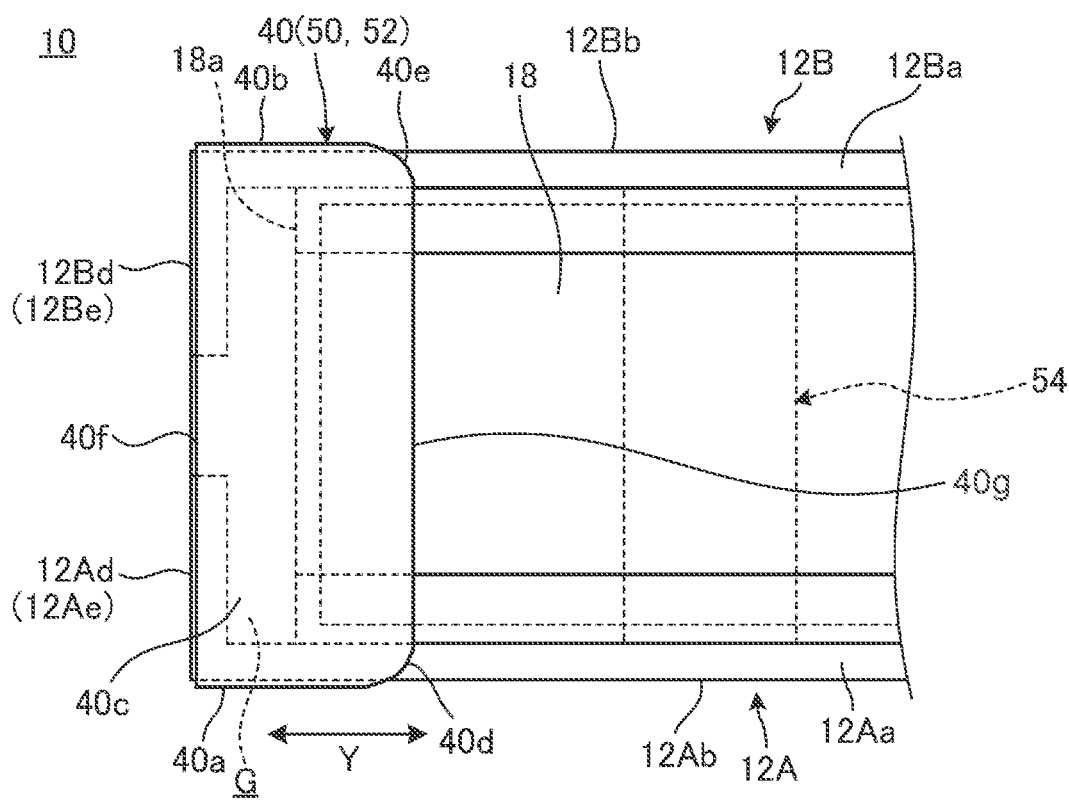
FIG. 13B is a schematic plan view in a state where a sheet-shaped member is provided in the portable information device illustrated in FIG. 13A."

FIG. 13A is a schematic enlarged plan view of a key part of the portable information device 10 using a hinge 54 according to a modification in the folded form. FIG. 13B is a schematic plan view in a state where the sheet-shaped member 40 is provided in the portable information device 10 illustrated in FIG. 13A.

As illustrated in FIG. 13A, the hinge 54 is placed in a position closer to the central side than the end of the adjacent edge 12Aa, 12Ba in the Y direction. Therefore, each of the ends 18a of the spine member 18 of this portable information device 10 is placed in a position to face the side faces 12Ad, 12Ae, and 12Bd, 12Be, respectively. Note that the gap G is formed between the end 18a and the inner surfaces of the side faces 12Ad and the like to prevent the end 18a of the spine member 18 from interfering with the rotational operation of the chassis 12A, 12B. Therefore, even in such a structure using the hinge 54, the sheet-shaped member 40 can be disposed to cover part or the whole of the gap G to prevent foreign matter from entering from the side opening 44 through the gap G. In the structure illustrated in FIG. 13B, the sheet-shaped member 50, 52 may also be used instead of the sheet-shaped member 40.

Note that the present invention is not limited to the embodiment mentioned above, and changes can be made freely without departing from the scope of the present invention.

In the above, the sheet-shaped member 40 or the like is a piece part, and the structure in which a pair of sheet-shaped members 40 or the like is provided at both ends of the folding cover section 27 in the Y direction is exemplified. However, the sheet-shaped member 40 or the like may also be formed as one long band-shaped member extending over the folding cover section 27 in the Y direction.

In the above, the cover device 14 having the stand cover section 22 is exemplified. However, when the stand function is unnecessary, the cover device 14 may omit the stand cover section 22.

In the above, the structure in which the cover device is fixed integrally to the chassis 12A and 12B is exemplified. However, the cover device 14 may also be a single part completely separated from the portable information device 10. In this case, the cover device 14 may be removably mounted on the chassis 12A and 12B, for example, using a magnet or a hook.

In the above, the portable information device 10 foldable in half like a book is exemplified. However, in addition to the structure in which the same shaped chassis are folded in half, various structures can be exemplified as foldable portable information devices, such as a double-door structure in which two small-sized chassis are coupled to the right and left edges of a large-sized chassis in a foldable manner, an S-shaped folding structure in which two chassis different in folding direction from each other are coupled to the right and left edges of one chassis, and a J-shaped folding structure in which two small-sized chassis are coupled to one of the right and left edges of a large-sized chassis in a foldable manner, and the number of coupled chassis may be four or more. In this case, the cover device 14 may have such a structure as to cover the whole or part of the back surface of each chassis, and two or more chassis may be used simultaneously.

The invention claimed is:

1. A portable information device comprising:
   a first chassis;
   a second chassis adjacent to and rotatably coupled to the first chassis to enable movement between a flat plate form in which the first chassis and the second chassis are lined up with each other in a direction perpendicular to a surface normal direction and a folded form in which the first chassis and the second chassis are folded to overlap each other in the surface normal direction; and
   a cover device having a first cover section that covers a back surface of the first chassis, a second cover section that covers a back surface of the second chassis, and a folding cover section that rotatably connects the first cover section with the second cover section, wherein
   the cover device further has a sheet-shaped member that faces a side edge on an inner surface of the folding cover section and that is movable relative to the inner surface of the folding cover section, and
   the folding cover section covers adjacent edges of the first chassis and the second chassis in the folded form, and the sheet-shaped member covers adjacent edges inside the folding cover section as viewed from a rotating axis direction of the first chassis and the second chassis.

2. The portable information device according to claim 1, wherein the sheet-shaped member has a first end part fixed to the first cover section, a second end part fixed to the second cover section, and a central part between the first end part and the second end part; and the sheet-shaped member is configured to freely move over the inner surface of the folding cover section.

3. The portable information device according to claim 2, wherein
   the sheet-shaped member has elasticity, and
   the sheet-shaped member is disposed along the inner surface of the folding cover section in a tension state to keep a resilient force in the flat plate form.

4. The portable information device according to claim 3, wherein
the sheet-shaped member includes:
a first sheet-shaped member facing a first side edge of the folding cover section, and
a second sheet-shaped member facing a second side edge of the folding cover section,
only part of the first sheet-shaped member on a side of the first side edge is fixed to the first cover section and the second cover section, and
only part of the second sheet-shaped member on a side of the second side edge is fixed to the first cover section and the second cover section.

5. The portable information device according to claim 4, wherein
the first end part and the second end part of the first sheet-shaped member have chamfer shapes in corner portions thereof, and
the first end part and the second end part of the second sheet-shaped member have chamfer shapes in corner portions thereof.

6. The portable information device according to claim 1, further comprising:
a first hinge on one end side of the adjacent edges to couple the first chassis and the second chassis;
a second hinge on another end side of the adjacent edges to couple the first chassis and the second chassis; and
a spine member supported by the first chassis and the second chassis and disposed across the adjacent edges and extends along the adjacent edges between the first hinge and the second hinge, wherein
gaps are formed between one end of the spine member and the first hinge and between another end of the spine member and the second hinge, respectively, and
the sheet-shaped member covers at least the gaps in the folded form.

7. The portable information device according to claim 6, wherein the sheet-shaped member further covers the first hinge and the second hinge in the folded form.

8. The portable information device according to claim 6, wherein the sheet-shaped member covers part of the spine member in the folded form.

9. A cover device configured to cover a back surface of a chassis of a portable information device, comprising:
a first cover section;
a second cover section;
a folding cover section which rotatably connects the first cover section with the second cover section; and
a sheet-shaped member that faces a side edge on an inner surface of the folding cover section and that is movable relative to the inner surface of the folding cover section.

10. The cover device according to claim 9, wherein the sheet-shaped member has a first end part fixed to the first cover section, a second end part fixed to the second cover section, and a central part between the first end part and the second end part; and the sheet-shaped member is configured to freely move over the inner surface of the folding cover section.

11. The cover device according to claim 10, wherein
the sheet-shaped member has elasticity, and
the sheet-shaped member is disposed along the inner surface of the folding cover section in a tension state to keep a resilient force in a flat plate form in which the first chassis and the second chassis are lined up with each other in a direction perpendicular to a surface normal direction.

12. The cover device according to claim 11, wherein
the sheet-shaped member includes
a first sheet-shaped member facing a first side edge of the folding cover section, and
a second sheet-shaped member facing a second side edge of the folding cover section,
only part of the first sheet-shaped member on a side of the first side edge is fixed to the first cover section and the second cover section, and
only part of the second sheet-shaped member on a side of the second side edge is fixed to the first cover section and the second cover section.

* * * * *